(12) United States Patent
Speck

(10) Patent No.: US 7,302,412 B1
(45) Date of Patent: Nov. 27, 2007

(54) METHOD FOR REITERATIVE BETTING BASED ON SUPPLY AND DEMAND OF BETTING SHARES

(76) Inventor: Dimitri P. M. Speck, Tizianstrasse 33, 80638 Munich (DE)

(*) Notice: Subject to any disclaimer, the term of this patent is extended or adjusted under 35 U.S.C. 154(b) by 0 days.

(21) Appl. No.: 09/487,962

(22) Filed: Jan. 18, 2000

(51) Int. Cl.
G06Q 30/00 (2006.01)

(52) U.S. Cl. .................. 705/37; 705/38; 705/80; 463/16; 463/20; 463/27; 463/43

(58) Field of Classification Search ............ 705/26, 705/27, 37, 38, 80, 35, 36; 463/16, 20, 27, 463/43, 42
See application file for complete search history.

(56) References Cited

U.S. PATENT DOCUMENTS 5,564,700 A * 10/1996 Celona .................. 463/27
5,564,701 A * 10/1996 Dettor .................. 463/16
5,749,785 A    5/1998 Rossides ............... 463/25

(Continued)

OTHER PUBLICATIONS

David M. Pennock, a dynamic pari-mutuel market for hedging, wagering, and information aggregation, proceedings of the fifth ACM conference on electronic commerce (EC'04), May 2004. <http://dpennock.com/papers/pennock-ec-2004-dynamic-parimiutuel.pdf>, pp. 1-10.

(Continued)

Primary Examiner—Nga Nguyen

(74) Attorney, Agent, or Firm—Lumen Intellectual Property Services, Inc.

(57) ABSTRACT

A betting method determines rate of return on a bet by employing supply and demand forces. The bet can be made on any uncertain future event that has at least two outcomes (e.g. sporting events, financial market fluctuations, and elections). Investors that place a bet on a particular outcome provide money to a betting machine and receive shares (specific to the chosen outcome) in return. For each possible outcome there is a share type. Shares that correspond with the winning bet have a certain guaranteed value when the outcome is determined; losing share types are normally defined as worthless. Before the winning bet is determined, share values are calculated following a supply and demand model according to the following equation:

$$Q_1 = \frac{B_1}{B_{Tot}}$$

where $Q_1$ is the share value for shares corresponding to a first outcome, $B_1$ is the amount bet upon the first outcome, and $B_{Tot}$ is the total amount bet on all outcomes. Analogous equations determine share values for all other outcomes. In the present method, share value calculations can be reiterated so that new bets can be placed, and shares can be redeemed for money before the event occurs. In subsequent iterations, the machine exchanges shares for money from new investors and exchanges money for shares redeemed by investors from a previous iteration. The machine calculates revised share values for each outcome based on the amounts of money and shares exchanged. The calculation of the new share values generally involves the solution of a polynomial of order n+1, where n is the number of different outcomes.

23 Claims, 3 Drawing Sheets

U.S. PATENT DOCUMENTS

| | | | |
|---|---|---|---|
| 5,873,782 A | 2/1999 | Hall | |
| 6,321,212 B1 | 11/2001 | Lange | 705/37 |
| 6,336,862 B1 * | 1/2002 | Byrne | 463/27 |
| 6,443,841 B1 | 9/2002 | Rossides | 463/25 |
| 6,695,701 B2 | 2/2004 | Aronson et al. | 463/28 |

OTHER PUBLICATIONS

Robert J. Shiller, "Radical financial innovation." Cowles foundation discussion paper No. 1461, Apr. 2004.<http://cowles.econ.yale.edu/> pp. 1-29.

* cited by examiner

METHOD FOR REITERATIVE BETTING BASED ON SUPPLY AND DEMAND OF BETTING SHARES

COPYRIGHT PROTECTED MATERIAL

A portion of the disclosure of this patent contains material which is subject to copyright protection. The copyright owner has no objection to the facsimile reproduction of by anyone of the patent document or patent disclosure as it appears in the Patent and Trademark Office patent file or records but otherwise reserves all copyright rights whatsoever.

FIELD OF THE INVENTION

The present invention relates generally to betting and financial instruments. More particularly, it relates to a method for betting on the outcome of any uncertain event, where the rate of return is determined by market forces. The method can be repeated periodically to update the rate of return as market forces change.

BACKGROUND OF THE INVENTION

There are many ways to bet or gamble on the outcome of uncertain events such as sporting events, market fluctuations or politics. Presently, betting requires that a bookmaker or broker take the bet and set odds based on perceived outcome probabilities. After the event takes place, bettors are compensated or relieved of their money.

Betting through a bookmaker has the disadvantage that bets cannot be updated. Betting by bookmaker cannot be easily reiterated. Also, a bettor cannot remove money from the bet before the event takes place. There is no mechanism for establishing the value of a bet before the event occurs.

It would be an advance in the art of betting and financial instruments to provide a highly adaptable method for placing bets on any event. It would also be an advance for the method to be reiterative so that bets could be updated at any time. Also, it would be an advance for the method to be controlled by market forces so that the betting method does not require assumptions on the likely outcome of the bet.

OBJECTS AND ADVANTAGES OF THE INVENTION

Accordingly, it is a primary object of the present invention to provide a betting method that:

1) does not require a bookmaker;

2) does not require any knowledge of the event being bet upon to establish bet costs and payback odds;

3) relies upon supply and demand forces to establish betting odds;

4) relies upon supply and demand forces to determine the value of bets at any time before the event occurs;

5) enables iterative betting as investor can invest or withdraw at any time.

These and other objects and advantages will be apparent upon reading the following description and accompanying drawings.

SUMMARY OF THE INVENTION

These objects and advantages are attained by a method for conducting a reiterative betting process for investors. In the present method, an uncertain future event is selected that has outcomes $O_1, \ldots O_m$, where $m \geq 2$. A betting machine receives bets $B_1, \ldots, B_m$ from investors. A total bet $B_{tot}$ is defined as $B_1+B_2+ \ldots +B_m=B_{tot}$. Numbers $OS(1), \ldots, OS(m)$ of outcome shares are issued corresponding to the potential outcomes $O_1, \ldots O_m$. Each outcome has a corresponding outcome share group. Each outcome share group has the same number of shares. Next, quote values $Q_1, \ldots Q_m$ are assigned for outcome shares based on the equations $Q_1=B_1/B_{tot}, \ldots, Q_m=B_m/B_{tot}$. Then, the outcome shares are distributed to the investors. After the event occurs, winning shares are defined. Winning shares are guaranteed to have a certain nonzero value.

In a preferred embodiment, the total bet $B_{tot}$ is divided among the winning shares.

Also in a preferred embodiment, the winning shares comprise exactly one share group.

The present method can be reiterated by recalculating quote values $Q_1, \ldots, Q_m$. The quote values are recalculated after new money is provided to the betting machine for new bets and after shares are returned to the machine by withdrawing investors.

DETAILED DESCRIPTION

The present invention provides a reiterative betting method that is adaptable to many different betting situations and financial instruments. The method allows for individual bettors to update their bets at certain specified times, and defines values for different bets based on market forces. Also, the betting method does not require that a betting machine (i.e., an automated 'bookie' facilitating the bets) have any knowledge of the events being bet upon. Market forces alone can determine the payouts (i.e., the 'odds') for the different event outcomes.

Figure 1:
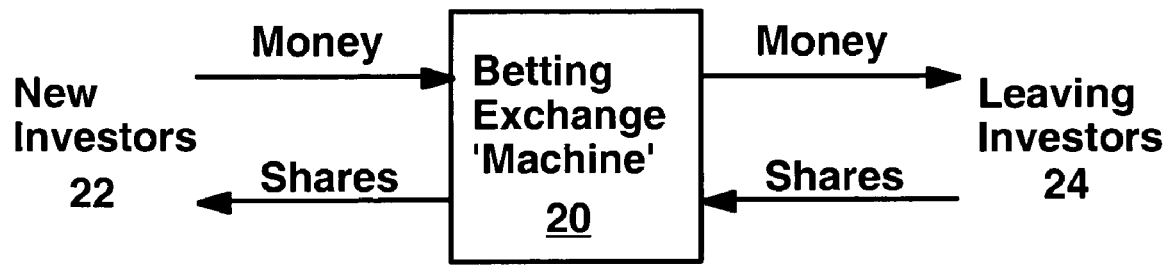
FIG. 1 is a schematic diagram of an embodiment of the method of the present invention.

FIG. 1 shows a schematic diagram of the reiterative betting method according to the present invention. A betting exchange machine 20 facilitates the exchange of money and shares between new investors 22 and leaving investors 24. New investors provide money to the betting machine and receive betting shares; leaving investors receive money in exchange for their betting shares. Placing new bets and removing old bets changes the value of shares. Alternatively, the machine may accept tokens, credits or some other easily exchangeable commodity in lieu of money.

The method of the present invention provides betting share prices for new investors and leaving investors according to an algorithm based on supply-and-demand principles.

Consider, for example, a simple betting machine designed for facilitating bets on the winner in a two-way election between two candidates Smith and Jones. In this bet, there are exactly two possible outcomes: a Smith victory, and a Jones victory. Investors A, B, C, and D bet the following sums on the candidates:

| Bets placed by investors | | |
|---|---|---|
| Investor | Smith | Jones |
| A | $5 | 0 |
| B | $9 | 0 |
| C | 0 | $7 |
| D | 0 | $11 |

According to the method of the invention, investors A and B are issued 'Smith' shares, and investors C and D are issued 'Jones' shares in exchange for money provided by investors A, B, C, and D. After the election, Smith shares will have zero value in case of a Jones victory, and Jones shares will have zero value in case of a Smith victory. Also, Smith shares are guaranteed to have a certain nonzero value in case of a Smith victory, and Jones shares are guaranteed to have a certain nonzero value in case of a Jones victory. Up until the time of the election, per-share value for a particular bet is determined according to the following equation:

$$\text{Share price} = Q_1 = \frac{B_1}{B_{Tot}}.$$

Where $B_1$ is the amount of money bet on a particular outcome n (e.g. $14 for Smith, or $18 for Jones), and $B_{tot}$ is the total amount of money in the betting system. In the present example $B_{tot}$ is $32.

For instance, each Smith share has a value of:

$$\text{Smith share} = \frac{\$14}{\$32} = \$0.4375.$$

Where $14 ($5+$9) was the amount bet on Smith, and $32 is the total amount of money bet on both Smith and Jones.

Each Jones share has a value of:

$$\text{Jones share} = \frac{\$18}{\$32} = \$0.5625.$$

Where $18 ($7+$11) is the amount bet on Jones.

According to these share prices, investors A, B, C and D are given the following numbers of shares:

| Investor | Cost per share | Number and type of shares purchased |
|---|---|---|
| A | $0.4375 | 11.428, Smith |
| B | $0.4375 | 20.571, Smith |
| C | $0.5625 | 12.444, Jones |
| D | $0.5625 | 19.555, Jones |

It is important to note that the total number of Smith shares (11.428+20.571=32) is equal to the total number of Jones shares (12.444+19.555=32). In the case of a Smith victory, the Jones shares will be worthless and the Smith shares will be worth $1 each. Similarly, in case of a Jones victory, the Smith shares will be worthless, and the Jones shares will be worth $1 each.

Figure 2:
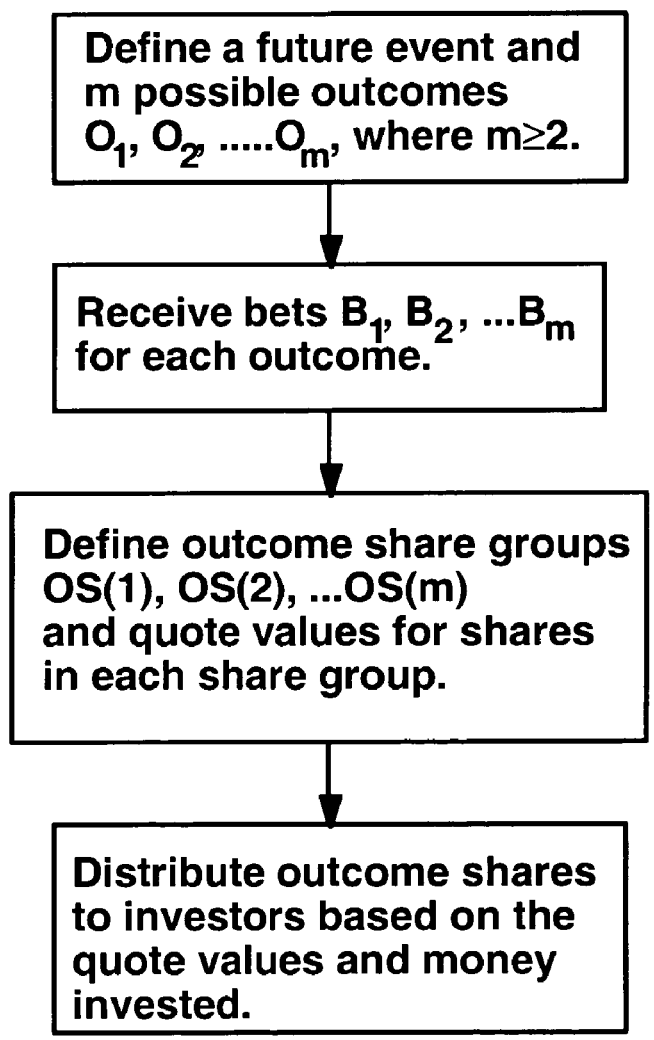
FIG. 2 shows a flow chart describing an embodiment of the method of the present invention.

FIG. 2 illustrates the method of the present invention in more general terms. In the method of the present invention, a betting machine or system is provided that allows for bets to be made on an uncertain future event with m outcomes: $O_1, O_2, \ldots O_m$, where $m \geq 2$. In a first step, the outcomes $O_1, O_2, \ldots O_m$ are defined. The outcomes can be based on any uncertain future event such as a sporting event, election, weather, financial markets or any other uncertain event. Furthermore, the uncertain event could occur in the present or past as long as the outcome of the event is in doubt during the betting process.

In a first betting cycle, bets $B_1, B_2, \ldots B_m$, are received for the outcomes $O_1, O_2, \ldots O_m$. Each bet $B_1, B_2, \ldots B_m$ may represent a sub-total of bets from one or more investors. The bets $B_1, B_2, \ldots B_m$ comprise a bet total $B_{tot}$, where $B_1+B_2+\ldots+B_m=B_{tot}$.

Next, outcome share groups $OS_1, OS_2, \ldots OS_m$ are defined. The number of outcome shares in each outcome share group is the same; i.e. the number of outcome shares $OS_1$ for outcome (1) is equal to the number of outcome shares $OS_m$ for outcome (m). In the Smith-Jones example above, the number of shares in an outcome share group is 32. The outcome shares in each share group are assigned quote values $Q_1, \ldots, Q_m$. The quote values are defined according to the equations $Q_1=(SV^*B_1)/B_{tot}, Q_m=(SV^*B_m)/B_{tot}$, where SV is a share value for the winning shares.

The outcome shares are then distributed to the investors in proportion to their investments so that the value of the shares purchased is equal to the amount of money invested. The value of the shares may increase or decrease after the event bet upon, or after repeated betting iterations, as explained below.

In one aspect of the invention, the investors hold the shares until the event bet upon occurs. The actual outcome AO of the event corresponds to winning shares WS selected from the outcome share groups $OS_1, OS_2, \ldots OS_m$. Typically, winning shares WS are confined to exactly one outcome share group, but this is not necessarily so. Winning shares may be apportioned among two or more different outcomes in any suitable proportion. Once winning shares WS are determined, the winning shares are declared to have normalized values such that:

$$(NWS)^*(SV)=B_{tot},$$

where NWS is the number of winning shares. Therefore, the total amount of money in the system is distributed among the winning shares WS. In the above Smith-Jones example, the total bet $B_{tot}$ is divided among the Smith shares in case of a Smith victory, and the total bet $B_{tot}$ is divided among the Jones shares in case of a Jones victory.

In a preferred embodiment of the present invention, the winning shares WS comprise exactly one outcome share group. Other share groups are declared worthless. The total bet $B_{tot}$ is distributed among the outcome share group comprising the winning shares.

In a preferred embodiment of the present invention, the number of shares in each share group is equal to the number of dollars in the total bet $B_{tot}$ (32 in the Smith-Jones example). In this way, the value of the shares SV in the winning share group is exactly one unit of currency such as $1, 1 euro, etc. Of course, other values for winning shares can be predetermined. In the case where winning shares have a predetermined $1 share value, the sum of the quote values for the different share groups must add up to $1 (e.g., in the first Smith-Jones iteration, $0.4375+$0.5625=$1).

In the present invention, the betting process can be reiterated many times before the betting event takes place. In this embodiment, the betting process is reiterated at certain times and money and shares are exchanged. During a particular betting period the investors invest a sum IM(i) on the outcome $O_i$ for an event. In return, the betting machine gives out total a number OS(i) of shares to the investors for each outcome $O_i$. Investors withdrawing from the event return a number IS(i) of shares for outcome $O_i$. In return the machine pays out a sum of money OM(i) to the investors withdrawing from event i.

The preferred embodiment of the betting algorithm requires that:

i) the number of outstanding shares be the same for each event i;
ii) The invested money must be able to cover all potential claims;
iii) Investors buying in get the same quote as withdrawing investors; and For example, in the first period the sum of all money invested is:

$IM_{tot}=IM(1)+IM(2)+IM(3)+\ldots$ . Similarly, the sum of all money returned by the machine in a given betting period is given by $OM_{tot}=OM(1)+OM(2)+OM(3)+\ldots$ . In any given period, the machine retains a total amount of money $IM_{tot}-OM_{tot}$. Condition ii requires that all $OS(i)=IM_{tot}$. The number of outstanding shares of each event changes by an amount $OS(i)-IS(i)$. Condition i requires that in each period the differences $OS(i)-IS(i)$ are the same for all events i. The quote $Q_i$ for an event i is given by: $Q_i=IM(i)/OS(i)$. For a given betting period the unknowns are the OS(i)'s, the OM(i)'s and the $Q_i$'s.

In any given betting period the betting machine keeps an additional amount of money $\Delta M$ given by $\Delta M=IM(1)+IM(2)+IM(3)+\ldots-OM(1)-)M(2)-OM(3)\ldots$ In any given betting period the number of shares for a given event i changes by an amount $\Delta S_i$ given by:

$\Delta S_i=OS(i)-IS(i)$

Because of condition i, all $\Delta S_i$ must be equal, i.e.:

$OS(1)-IS(1)=OS(2)-IS(2)=OS(3)-IS(3)$, etc.

This is equivalent to $OS(2)=OS(1)-IS(1)+IS(2)$ $OS(3)=OS(1)-IS(1)+IS(3)\ldots$ $OS(i)=OS(1)-IS(1)+IS(i)$ Because of condition iii, the quotes of the events are:

$$Q_i = \frac{IM(i)}{OS(i)} = \frac{OM(i)}{IS(i)}$$

which reduces to $$OM(i) = \frac{IM(i) \cdot IS(i)}{OS(i)} \text{ for event } i.$$

Specifically:

$$OM(1) = \frac{IM(1) \cdot IS(1)}{OS(1)} \text{ and } OM(i) = \frac{IM(i) \cdot IS(i)}{OS(1) - IS(1) + IS(i)}$$

From condition ii, it follows that:

$OS(1)-IS(1)=IM(1)+IM(2)+IM(3)+\ldots-OM(1)-OM(2)-OM(3)-\ldots$ and from the above equations, it follows that $$OS(1) = IS(1) + IM(1) + IM(2) + IM(3) + \ldots - \frac{IM(1) \cdot IS(1)}{OS(1)} - \frac{IM(2) \cdot IS(2)}{OS(1) - IS(1) + IS(2)} - \frac{IM(3) \cdot IS(3)}{OS(1) - IS(1) + IS(3)} - \ldots$$

The above equation is a betting machine polynomial for event 1. In this equation, only OS(1) is unknown and can be found by determining the correct root of the polynomial. The corresponding quote value for event 1 is $Q_1=IM(1)/OS(1)$. Incorrect roots can be eliminated by the following conditions:

a) The quote values $Q_i$ must be between 0 and 1.
b) The sum of all quotes $Q_i$ must be equal to 1.
c) The $Q_I$, OS(i), and OM(i) must be positive numbers,
d) The correct root must be a real number, etc.

The unknown OM(1) can be determined from $$OM(1) = \frac{IM(1) \cdot IS(1)}{OS(1)}$$

Once OS(1) and $Q_1$ are determined, the OS(i) and $Q_i$ values can be determined using $OS(i)=OS(1)-IS(1)+IS(i)$ and $Q_i=IM(i)/OS(i)$.

Generally, if there are n different events, the machine must compute n different quotes. In general the machine must calculate the solution of a polynomial having n+1 roots. The above example is used for the purpose of illustration only. Those skilled in the art will recognize that the same procedure can be used to determine any of the OS(i) values. A printout of a computer code that implements the above algorithm is attached as an appendix. The code in the appendix is protected by a copyright to the present inventor.

Note, the case where one of the IM(i)=0 generally involves a more complex code. Some rare cases of IM(i)=0 currently defy solution for mathematical reasons. To simplify the solution of the $Q_i$'s the case of IM(i)=0 may be excluded. For example if no real investor invests in event i, a minimum amount, e.g., $1, may be invested by an "artificial" participant organized by the operator of the investor for the event.

In the Smith-Jones election example, the initial bets are:

| Investor | Smith | Jones |
|---|---|---|
| A | $5 | 0 |
| B | $9 | 0 |
| C | 0 | $7 |
| D | 0 | $11 |

To illustrate the present method of reiterative betting, the following changes occur in a second iteration of the Smith-Jones bet. Dollar values in the table indicate new money contributed to the machine. Investors E and F are new investors.

| Investor | Smith, first iteration | Jones, first iteration | Smith, second iteration | Jones, second iteration |
|---|---|---|---|---|
| A | $5 | 0 | $3 | 0 |
| B | $9 | 0 | Redeem 10 shares | 0 |
| C | 0 | $7 | 0 | $6 |
| D | 0 | $11 | 0 | Redeem 10 shares |
| E | 0 | 0 | $8 | 0 |
| F | 0 | 0 | 0 | $12 |

The total amount of money in machine after the first iteration is: $B_{tot}$=$5+$9+$7+$11=$32. In the preferred embodiment this is equal to the number of shares outstanding.

It is important to note that before money is paid to investors B and D for redeemed shares, new, reassigned quote values must be calculated for Smith and Jones shares. This is done by recalculating the money and shares in each bet. To illustrate, the following represents the status of the betting machine after the second iteration:

The total money bet on Smith is: 5+9+3+8=$25

The total money bet on Jones is: 7+11+6+12=$36

The total money in machine after the second iteration, but before payout for redeemed shares is: 25+36=$61

In the second iteration, the conditions are as follows

Smith: 1, IM(1)=3+8=11, IS(1)=10

Jones: 2, IM(2)=6+12=18 IS(2)=10.

In this example, the condition IS(1)=IS(2) was chosen for the sake of simplicity.

The unknowns for the second iteration are $Q_1$, $Q_2$, OM(1), OM(2), OS(1), and OS(2).

Because of condition i, OS(1)−IS(1)=OS(2)−IS(2). However, since in this case IS(1)=IS(2), it is clear that OS(1)=OS(2).

Because of condition iii:

$$Q_1 = \frac{IM(1)}{OS(1)} = \frac{OM(1)}{IS(1)}.$$

By plugging in the known values of IM(1) and IS(1) we obtain $$\frac{11}{OS(1)} = \frac{OM(1)}{10} \Rightarrow OM(1) = \frac{110}{OS(1)} = \frac{110}{OS(2)}.$$

Similarly:

$$Q_1 = \frac{IM(2)}{OS(2)} = \frac{OM(2)}{IS(2)},$$

which yields $\frac{18}{OS(2)} = \frac{OM(2)}{10} \Rightarrow OM(2) = \frac{180}{OS(2)}$ Because of condition ii:

OS(1)−IS(1)=IM(1)+IM(2)−OM(1)−OM(2), or

OS(1)−10=11+18−OM(1)−OM(2), which yields:

$$OS(1) = 39 - \frac{110}{OS(2)} - \frac{180}{OS(2)}.$$

which simplifies to $$OS(1) = 39 - \frac{290}{OS(2)}$$

Using the fact that OS(1)=OS(2), we obtain a quadratic, $OS(1)^2 - 39 \cdot OS(1) + 290 = 0$, which can be solved using the well-known quadratic formula.

The solution, $$OS(1) = \frac{39}{2} \pm \sqrt{\left(\frac{39}{2}\right)^2 - 290}$$

yields two roots.

OS(1)=10 and OS(1)=29.

Only one of these roots is meaningful. For example, the root OS(1)=10 would lead to a Smith quote value $$Q_1 = \frac{IM(1)}{OS(1)} = \frac{11}{10} = 1.1,$$

which is greater than 1 and is meaningless because of condition a. On the other hand, the root OS(1)=29 is the correct root, which yields a Smith quote value:

$$Q_1 = \frac{IM(1)}{OS(1)} = \frac{11}{29} = 0.3793,$$

Furthermore, since OS(1)=OS(2), we obtain a Jones quote value:

$$Q_2 = \frac{IM(2)}{OS(2)} = \frac{18}{29} = 0.6207$$

The calculations are simplified by the fact that OS(1)=OS(2). Those skilled in the mathematical arts will recognize that in the more general case, when OS(1)≠OS(2), the algorithm produces third order polynomial relating OS(1) and OS(2).

It is noted that investors B and D cannot know the quote values for their redeemed shares until the betting machine has received new money from other investors. In one embodiment of the invention, new quote values are calculated before leaving investors redeem their shares. In this way, leaving investors know the quote values for their shares before they are redeemed.

After the new quote values are calculated, money is paid to investors B and D for the redeemed shares. Investor B receives (10)*($0.3793)=$3.793, and investor D receives (10)*($0.6207)=$6.207. Thus, the investors B and D remove a total of $3.973+$6.907=$10 from the machine. At the same time investors A, C, E, and F respectively add $3+$6+$8+$12 for a total of $29 to the machine. Thus, the amount of money in the machine increases by $29-$10=$19. The total amount of money in the machine after the second iteration after payout for redeemed shares is: $B_{tot}'=\$32+\$19=\$51$.

The change in the number of Smith shares outstanding after the second iteration is determined as follows. B redeemed 10 Smith shares. A has purchased 3/0.3793=7.9093 Smith shares and E has purchased 8/0.3793=21.091 Smith shares which sum to a total of 29 shares that are added to the machine. After subtracting off the 10 shares redeemed by B we obtain a total change of +19 Smith shares outstanding for the second iteration. These shares are added to the 32 Smith shares outstanding from the first iteration for a total of 51 Smith shares outstanding after the second iteration. This is the same number as the total amount of money in the machine. A similar calculation yields 32+(6+12)0.6207−10=51 for the number of Jones shares outstanding after the second iteration.

This process can be repeated as often as desired up until the future event bet upon occurs: every hour, day or week. Every time the betting process is reiterated, new investors can join, leaving investors can leave, new money can be added to previous bets, and shares can be redeemed for money. The share prices reflect investor expectation of the future event, and these share prices dictate the cost of entering the bet, and the money paid out to those leaving the bet.

To further illustrate the operation of the reiterative betting method of the present invention, consider the example of 5 sports teams, V, W, X, Y, Z, competing in a tournament that will decide a single winner. On a particular day, the betting machine receives the following bets from a number of investors:

For team V: $1,500

For team W: $20,000

For team X: $25,000

For team Y: $50,000

For team Z: $80,000

In the same iteration, the machine receives the following shares from investors:

Team V shares redeemed: 1,000

Team W shares redeemed: 80,000

Team X shares redeemed: 10,000

Team Y shares redeemed: 20,000

Team Z shares redeemed: 45,000

The betting machine calculates the following quote values by solving a betting exchange polynomial of order 6:

Team V quote value per share: 0.01047

Team W quote value per share: 0.08998

Team X quote value per share: 0.16419

Team Y quote value per share: 0.30814

Team Z quote value per share: 0.42721

For the investors who contributed $80,000 for team Z shares, the betting machine provides 187,262 team Z shares because 187,262=80,000/0.42721. To the investors who redeemed 45,000 team Z shares, the betting machine pays out $19,224 because 19,224=45,000*0.42721. A total of 142,262=187,262−45,000 team Z shares are newly outstanding.

For the investors who contributed $50,000 for team Y shares, the betting machine provides 162,263 team Y shares because 162,263=50,000/0.30814. To the investors who redeemed 20,000 team Y shares, the betting machine pays out $6,162 because 6,162=20,000*0.30814. A total of 142,262=162,262−20,000 team Y shares are newly outstanding. This is the same number as for team Z.

This calculation is repeated for each of the other 3 teams.

Figure 3:
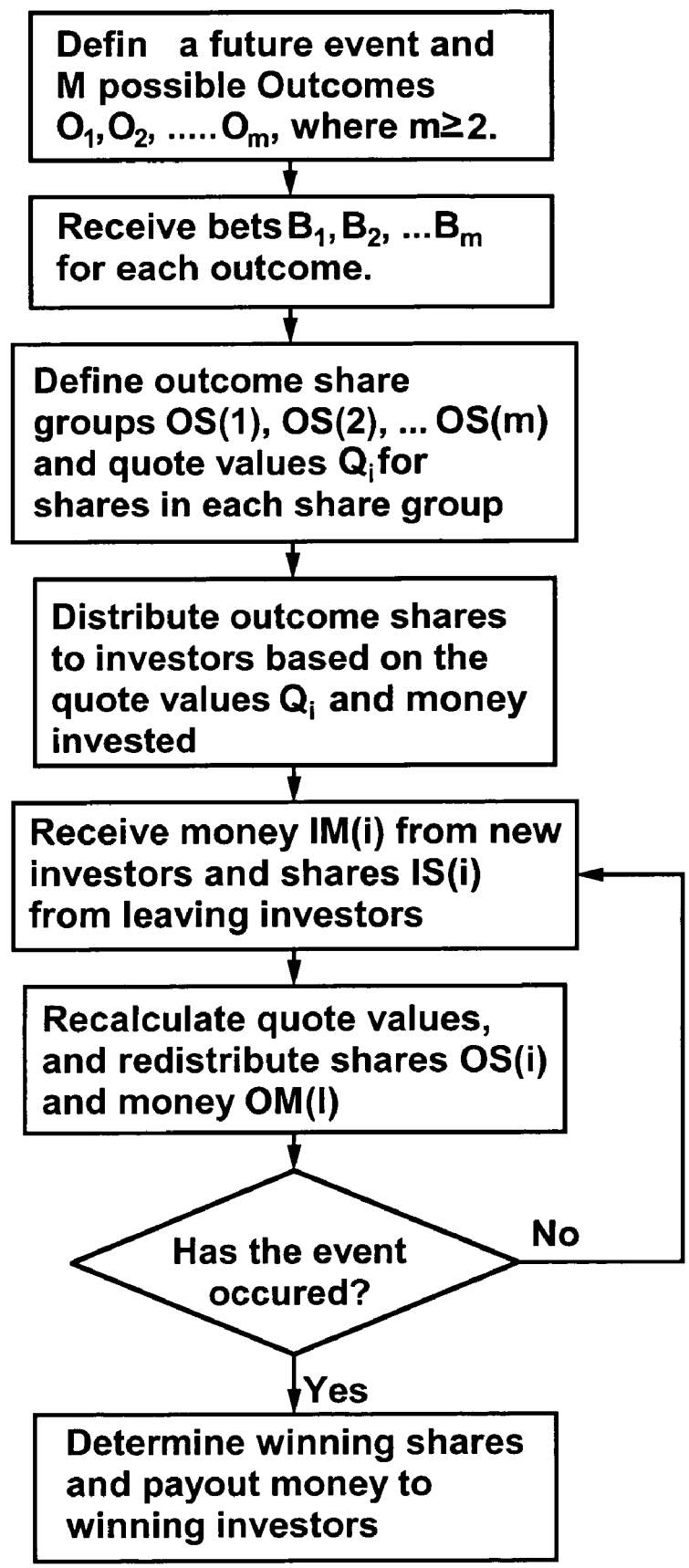
FIG. 3 shows a flow chart of the present method that incorporates betting reiteration.

FIG. 3 shows a flow chart of the present method where the betting machine operates through more than one betting iteration. In the present method, there is no limit on the number of iterations that can be performed.

The present betting method assures that the betting machine always has exactly enough money to pay out to the bet winner. The present betting method is a zero-sum method that takes money from bet losers and gives money to bet winners according to a precise algorithm. The amount of money held by the machine is always exactly what is needed to fulfill all investors' potential claims. Alternatively, the machine can hold more money than required to fulfill investors' claims.

There are many possible variations on the present betting method. In the embodiments described, the machine is left with zero money after all shares are redeemed. Alternatively, the machine can have money left over after the shares are redeemed. This provides a mechanism for the machine to make money. This can be accomplished by imposing a fee or surcharge for share purchases or redemptions. The fee can be proportional to the value of bets, for example.

In most cases, exactly one share group is defined as comprising all the winning shares. However, in alternative embodiments, combinations of shares can be defined as the winning shares. For example, in a case where two share groups are defined as winning shares, the total bet $B_{tot}$ can be divided among the two winning share groups. The total bet $B_{tot}$ can be divided among the two share groups equally or unequally. Also, the total bet $B_{tot}$ can be divided among more than two winning share groups.

A new investor purchasing shares can place limit orders that define a maximum share price the investor is willing to accept. Similarly, an investor can specify a stop-limit on the minimum prices acceptable for redeeming shares. This is particularly useful because share prices cannot be guaranteed before a new betting iteration is performed. Share prices cannot be guaranteed because share prices are determined only after the betting machine receives money from new investors.

Figure 4:
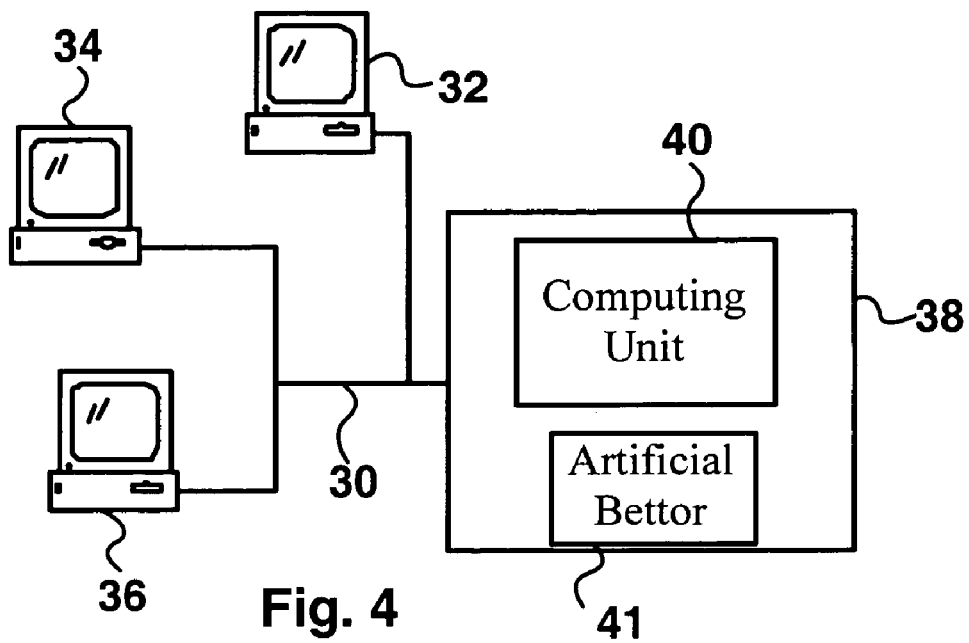
FIG. 4 shows an implementation of an embodiment of the present invention over a computer network.

FIG. 4 illustrates a preferred implementation of the present invention over a computer network 30. In this embodiment, computer terminals 32, 34, 36 are connected to a betting machine computer 38 over the network 30. The betting machine computer 38 has a computing unit 40 that performs calculations for share quote values and exchanges between shares and money. The betting machine 38 may include an artificial investor or bettor 41 to enter a nominal investment as described above.

Figure 5:
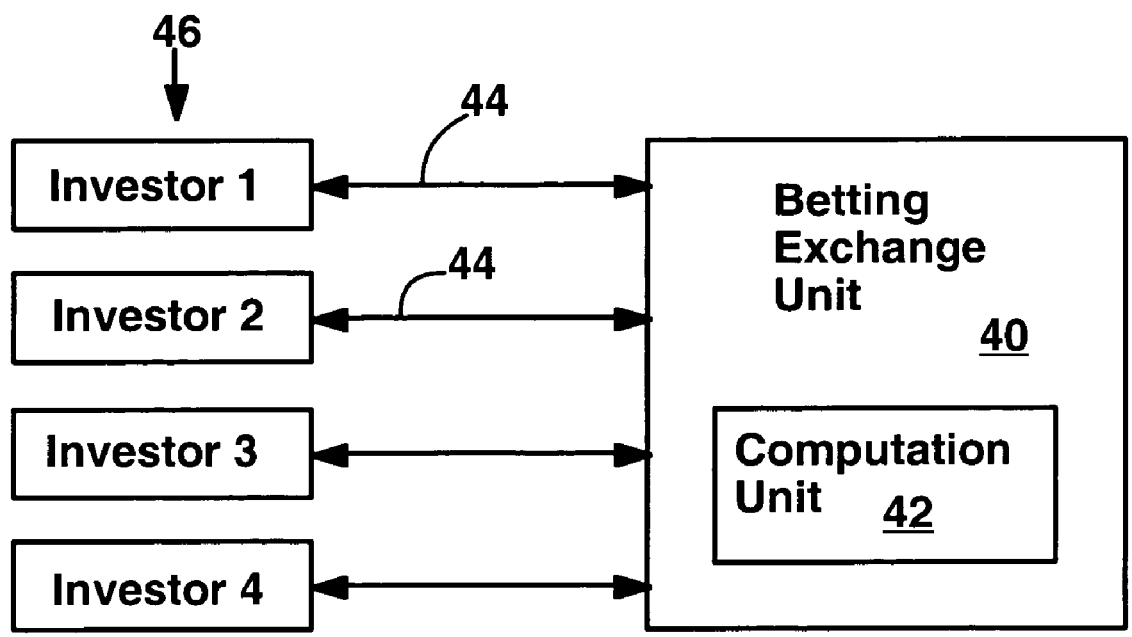
FIG. 5 shows a block diagram system for performing the reiterative betting method according to an embodiment of the present invention.

FIG. 5 shows a system for conducting a reiterative betting process according to the present invention. The system has a betting exchange unit 40, a computation unit 42 within the betting exchange unit 40, and connections 44 between investors 46 and the betting exchange unit. The connections 44 can comprise any kind of communications connection such as an Internet connection, local computer network connection, or telephone connection. In operation, the investors 46 give money to the betting exchange unit 40 and receive shares through the connections 44. The computation unit calculates share quote values to provide exchanges between money and shares.

Given that the share prices must be calculated AFTER new money is provided to the betting machine and shares are redeemed, a new investors are generally unable to determine the price of the shares being purchased. Similarly existing investors redeeming shares will generally be unable to determine the value of the shares being redeemed. For example, an investor may want to place a bet on a betting machine that reiterates every day, and has had an ongoing bet for several days. The investor cannot be sure what share price for the shares being bought. The price of shares depends upon how much other money and how many other shares are 'waiting is the wings'. The investor's own purchase or redemption of shares will also affect the share price. A large purchase by an investor will necessarily increase the price of the shares purchased. Similarly redemption of a large number of shares will necessarily decrease the price of the shares being redeemed. Therefore, it will generally be impossible for an investor to calculate a winning rate of return before buying or redeeming shares.

There are methods to deal with this problem. For example, outstanding, 'unconsummated' bets can be combined with the money and shares in the betting machine so that a PROJECTED share price can be posted. Of course, a large bet or redemption by an individual will change the share prices in the present reiteration. It seems then that individuals may use this to their advantage by pulling their bets or redemptions at the last possible moment, thereby strategically affecting the share prices.

It will be clear to one skilled in the art that the above embodiment may be altered in many ways without departing from the scope of the invention. For example, those skilled in the are will be able to devise algorithms in which new bet outcomes can be added or removed during an iteration. Combinations of shares could be defined as winning shares and a consolation prize could be paid for losing shares. Furthermore, variations on rules i-iii and a-d may be established. For example, the machine may hold more money than necessary to cover all bets. The number of shares for each event may be different, e.g., due to rounding. Alternatively, outstanding shares for a particular event may be split to reduce the share price and final claim. A new investor could declare a limit for the quote he would accept. A withdrawing investor could place a stop loss for the quote on shares he redeems. The machine may select a higher quote than calculated to obtain more assets. The quotes may be different for new shares as opposed to redeemed shares, e.g. quotes for new investors can be rounded up and quotes for new investors can be rounded down. Furthermore, the payout for one share need not be fixed, e.g. by combining the betting machine payout with a lottery. Accordingly, the scope of the invention should be determined by the following claims and their legal equivalents.

What is claimed is:

1. A computer-implemented method of conducting an iterative betting process for investors, the computer having a betting exchange unit for performing the following steps:
   a) identifying an uncertain event having m potential outcomes $O_1, \ldots, O_m$, where $m \geq 2$, and where the rate of return thereof is determined by market forces;
   b) initializing a first betting cycle;
   c) receiving bets $B_1, \ldots, B_m$ from the investors for $O_1, \ldots, O_m$ to accumulate an initial bet total $B_{tot}$;
   d) defining outcome share groups that correspond to $O_1, \ldots, O_m$ and issuing an equal number of outcome shares $OS(1), \ldots, OS(m)$ to each of the outcome share groups such that $OS(1) = \ldots = OS(m)$;
   e) assigning a share value SV to each of the outcome shares;
   f) assigning quote values $Q_1, \ldots, Q_m$ to each of the outcome shares such that $Q_1 = (SV*B_1)/B_{tot}, \ldots, Q_m = (SV*B_m)/B_{tot}$;
   g) distributing the outcome shares to the investors;
   h) initializing a subsequent betting cycle;
   i) receiving incoming money $IM(1), \ldots, IM(m)$ corresponding to subsequent bets $B_{1'}, \ldots, B_{m'}$ for $O_1, \ldots, O_m$;
   j) receiving numbers $IS(1), \ldots, IS(m)$ of incoming shares for outcomes $O_1, \ldots, O_m$ from one or more withdrawing investors; and
   k) re-assigning the quote values $Q_1, \ldots, Q_m$ to preserve an equal number of outstanding shares in outcomes $O_1, \ldots, O_m$ such that
   $OS(1)-IS(1) = \ldots = OS(m)-IS(m)$, wherein $OS(i)$ are numbers of outcome shares for outcomes $O_1, \ldots, O_m$ newly issued during the subsequent betting cycle.

2. The method of claim 1, further comprising the steps of:
   g1) monitoring an actual outcome of the uncertain event; and
   g2) selecting winning shares WS from the outcome share groups that correspond to the actual outcome; and
   g3) determining a number of winning shares NWS.

3. The method of claim 2, wherein the number of winning shares NWS is selected such that $NWS*SV = B_{tot}$.

4. The method of claim 2, wherein the step of monitoring the actual outcome is performed by a data acquisition unit.

5. The method of claim 1, wherein the investors comprise real investors and artificial investors.

6. The method of claim 5, wherein at least one artificial betting entity places a minimum initial bet $B_{min}$ on any of the potential outcomes $O_1, \ldots, O_m$ for which corresponding initial bets $B_1, \ldots, B_m$ are zero.

7. The method of claim 5, wherein the real investors are connected to the betting exchange unit by a communication network.

8. The method of claim 1, the method further comprising the following step:
   m) reiterating the subsequent betting cycle until the uncertain event occurs.

9. The method of claim 1, wherein the numbers of incoming outcome shares IS(i) and newly issued outcome shares OS(i) exchanged are in accordance with the reassigned quote values $Q_1, \ldots, Q_m$.

10. The method of claim 1, further comprising the steps of:
   k1) monitoring an actual outcome of the uncertain event; and
   k2) selecting winning shares WS from the outcome share groups that correspond to the actual outcome; and
   k3) assigning a normalized share value SV to each of the winning shares WS.

11. The method of claim 10, wherein the normalized share value SV is selected such that $NWS*SV=B_{tot}$, where NWS is the number of winning shares.

12. The method of claim 10 wherein said normalized share value SV is equal to a unit of currency.

13. The method of claim 8, further comprising:
   determining amounts of outgoing money $OM(1), \ldots, OM(m)$ for each kind of outcome share group, wherein each amount of outgoing money OM(i) is determined by $$OM(i) = \frac{IM(i) \cdot IS(i)}{OS(i)}.$$

14. The method of claim 13, wherein the revised quotes $Q_1 \ldots Q_m$ are determined by $$Q_i = \frac{IM(i)}{OS(i)} = \frac{OM(i)}{IS(i)}.$$

15. The method of claim 1, wherein step d) includes solving a polynomial of having m+1 roots.

16. A system for conducting an iterative betting process, the system having:
   a) a bet placing means enabling one or more investors to place bets $B_1, \ldots, B_m$ on m potential outcomes $O_1, \ldots, O_m$ of an uncertain event, where $m \geq 2$ and where the rate of return thereof is determined by market forces;
   b) a betting exchange unit initiating a first betting cycle and receiving the bets $B_1, \ldots, B_m$ from the investors during the first betting cycle, the bets $B_1, \ldots, B_m$ accumulating to an initial bet total $B_{tot}$, the betting exchange unit further comprising:
      i) a computing unit issuing equal numbers $OS(1), \ldots, OS(m)$ of outcome shares such that $OS(1)=\ldots=OS(m)$, the outcome shares corresponding to the potential outcomes $O_1, \ldots, O_m$, the computing unit assigning a share value SV to each of the outcome shares, the computing unit further assigning quote values $Q_1, \ldots, Q_m$ to each of the outcome
      shares $OS(1), \ldots, OS(m)$ such that $Q_1=(SV*B_1)/B_{tot}, \ldots, Q_m=(SV*B_m)/B_{tot}$; and
      ii) a distributing unit distributing the outcome shares to the investors.

17. The system of claim 16, wherein the computing unit further comprises an interface for receiving an actual outcome of the future event, the computing unit selecting from among the outcome shares winning shares WS corresponding to the actual outcome and assigning a normalized share value SV to each of the winning shares WS.

18. The system of claim 17, further comprising a data acquisition unit for monitoring the actual outcome, the data acquisition unit being connected to the interface.

19. The system of claim 16, wherein the investors comprise real investors and artificial investors.

20. The system of claim 16, wherein the bet placing means comprises a communication network.

21. The system of claim 16, wherein the betting exchange unit is programmed to initialize, conduct, and reiterate a subsequent betting cycle for receiving subsequent bets $B_1, \ldots, B_m$, placed on the potential outcomes $O_1, \ldots, O_m$ during the subsequent betting cycle and for receiving incoming shares $IS(1), \ldots, IS(m)$ from withdrawing investors during the subsequent betting cycle, and the computing unit is programmed to re-assign the quote values $Q_1, \ldots, Q_m$ to preserve an equal number of outstanding shares in outcomes $O_1, \ldots, O_m$ such that $$OS(1)-IS(1)=\ldots=OS(m)-IS(m).$$

22. The system of claim 21, wherein the computing unit further comprises an interface for receiving an actual outcome of the uncertain event, the computing unit selecting from the outcome shares winning shares WS corresponding to the actual outcome and normalizing values of the winning shares WS.

23. The system of claim 22, further comprising a data acquisition unit for monitoring the actual outcome, the data acquisition unit being connected to the interface.

* * * * *